Patented Dec. 10, 1935

2,023,976

UNITED STATES PATENT OFFICE 2,023,976

PROCESS FOR BREAKING PETROLEUM EMULSIONS

Claudius H. M. Roberts, San Marino, Calif., assignor to Tretolite Company, Webster Groves, Mo., a corporation of Missouri No Drawing. Application December 7, 1933, Serial No. 701,347

1 Claim. (Cl. 196—4)

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottom of oil storage tanks, and are commonly referred to as "cut oil", "roily oil", "emulsified oil", and "bottom settlings".

The object of my invention is to provide a novel and inexpensive process for separating emulsions of the character referred to into their component parts of oil and water or brine.

Briefly described, my process consists in subjecting a petroleum emulsion of the water-in-oil type to the action of a treating agent or demulsifying agent of the kind hereinafter described, thereby causing the emulsion to break down and separate into its component parts of oil and water or brine, when the emulsion is permitted to remain in a quiescent state after treatment, or is subjected to other equivalent separatory procedure.

The treating agent or demulsifying agent used in my process consists of a mixed ester of a polyhydric alcohol or alcohols of the kind obtained when a polyhydric alcohol or alcohols or derivatives thereof unite to form mixed type esters with two dissimilar carboxy acids, one being a detergent-forming carboxy acid, and the other being a polybasic carboxy acid, and furthermore, with the added qualification that at least two polyhydric alcohol hydroxyls attached to the same or different polyhydric alcohol molecules or residues be replaced by the same polybasic carboxy acid residue.

Said treating agent or demulsifying agent represents one sub-division of the broad class of materials contemplated for use as the treating agent of the process described in my pending application for patent Serial No. 665,962, filed April 13, 1933, and is also related in part to the more narrow class of materials contemplated for use as the treating agent of the process described in my pending application for patent Serial No. 701,345, filed December 7, 1933, but it is specifically different and not claimed per se in either of said pending applications.

Esters are obtained by reactions between alcohols, such as monohydric or polyhydric alcohols, and acids including monobasic or polybasic carboxy acids. One mole of a polyhydric alcohol may be combined with two moles of a monocarboxy acid. One might employ one mole each of two different carboxy acids. In cases where such carboxy acids are different but combined with the same polyhydric alcohol, one may refer to the resulting ester as a mixed ester. The treating agent contemplated by my process consists of a mixed ester in which one of the organic acids combined with the polyhydric alcohol or residue is derived from non-hydroxylated, detergent-forming, monocarboxy acids. It is well known that non-hydroxylated fatty acids such as oleic acid, stearic acid, palmitic acid, linoleic acid, etc. combine with alkalis such as caustic soda or caustic potash to form soaps or detergents. It is also known that non-hydroxylated, monocarboxy rosin acids, such as abietic acid, combine with alka-acids, to produce detergent material. Naphthenic acids derived from petroleum are generally non-hydroxylated and monocarboxylic, and they combine with alkalies to produce soap-like materials or detergents. The expression "non-hydroxylated" detergent-forming, monocarboxy acids refers to the type of materials above indicated. The polyhydric alcohol employed to produce the treating agent used in my process must not only be combined with at least one molecule of a non-hydroxylated, detergent-forming, monocarboxy acid, but it must also be combined with at least one molecule of a polybasic acid, and further-more, with the added qualification that at least two polyhydric alcohol hydroxyls attached to the same or different polyhydric alcohol molecules or residues be replaced by the same carboxy acid residue.

One may denote a polyhydric alcohol by the formula $R'(OH)_n$, in which $n$ represents the numeral two or more. A polybasic, carboxy acid may be denoted by the formula $A'(COOH)_n$, in which $n$ represents the numeral two or more. The non-hydroxylated, monocarboxy, detergent-forming acids herein contemplated may be represented by the formula $D'COOH$, in which $D'$ represents the characteristic hydrocarbon chain and COOH is the conventional carboxyl group.

In my said co-pending application Serial No. 701,345, filed December 7, 1933, it was shown that if a trihydric alcohol, such as glycerol is combined with a dibasic acid, such as succinic acid and also with the monocarboxy, detergent-forming acid such as oleic acid, so that complete esterification results, then the finished product may be expressed by the formula D.A:R., in which R is the polyhydric alcohol residue, A is the polybasic acid residue, and D is the detergent-forming acid residue. If glycerol is replaced by a dihydric alcohol such as ethylene glycol, and if the glycol is first combined with an oleic acid and then combined with succinic acid, it is obvious that a mixed acid ester must result, insofar that the mixed ester contains an uncombined carboxyl radical. Such a type of mixed ester may be designated by the formula D.A.(COOH)$_t$R, in which formula the symbols have their previous significance and $t$ represents the numeral one or more. If glycerol is replaced by diglycerol, which is an ether alcohol having four hydroxyls, and if a mole of oleic acid and a mole of succinic acid be combined therewith, the mixed ester thus resulting would contain a free hydroxyl and the material of this type may be represented by the following formula: D.A:R.(OH)$_t$. Similarly, incomplete esterification, such as reaction between oleic acid and one hydroxyl radical of glycerol and also between one carboxyl of succinic acid and one of the remaining hydroxyls of the same glycerol, will result in an amphoteric mixed ester of the formula D.A.(COOH)$_t$R.(OH)$_a$. Thus, one may obtain a neutral ester, or a basic ester, or an amphoteric ester. Briefly, then, in the broadest sense the esters described above, may be indicated by the formula D.A.(COOH)$_m$R.(OH)$_m$, in which $m$ represents the numeral zero or one or more. In any case, residual hydroxyl radicals, may be esterified with any suitable acids, such as acetic acid, benzoic acid, etc.

In the present process one is concerned with a treating agent or demulsifying agent having the general characteristic of a mixed ester and having the additional qualification that at least two polyhydric alcohol hydroxyls attached to the same or different polyhydric alcohol molecules or residues must be replaced by the same polybasic carboxy acid residue. For instance, if one reacts one mole of glycerol with one mole of phthalic acid so that esterification is complete, and then reacts a mole of oleic acid with the previously formed ester, one then obtains a compound which may be represented by the type formula D.A:R., in which D is the detergent-forming acid residue, A is the polybasic acid residue and R is the polyhydric alcohol residue. Such a product is a mixed ester, because two different organic acids are combined with the same base and the formula employs a colon between A and R to indicate that the two valences of the radical R are satisfied by the dibasic acid residue. Such a product is a mixed ester of the kind which has been described previously and may be considered neutral in the sense that the mixed ester contains no residual carboxyl or hydroxyl group. However, if one combined oleic acid with glycerine so as to produce mono-olein and then esterified the mono-olein with a tricarboxy acid such as citric acid so that the two remaining glycerol hydroxyls are replaced by the polybasic acid residue, and so that there is a residual carboxyl, then the mixed ester so obtained may be represented by the formula D.(COOH)$_t$A:R, in which the symbols have their previous significance. Likewise, if one combined two moles of glycerol to give one mole of diglycerol, which is an ether alcohol, having four alcoholic hydroxyls, and combined one mole of diglycerol with one mole of oleic acid and one mole of phthalic anhydride so as to obtain complete esterification, then there still would remain a residual uncombined hydroxyl and the material might be characterized by the formula D.A:R.(OH)$_t$, in which the symbols have their previous significance.

In the previous case one would have an acidic mixed ester and in this latter case one obtains a basic mixed ester. Similarly, if diglycerol were combined with one mole of oleic acid and then with two carboxyls of a mole of citric acid, one would obtain a mixed ester of the type D.(COOH)$_t$.A:R.(OH)$_t$. This latter would represent an amphoteric type of mixed ester. It should be noted that in all cases, whether the mixed ester is neutral, acidic, basic, or amphoteric, that at least two carboxyls of the polyhydric alcohol have been replaced by the same polybasic acid residue.

However, the mixed ester may be of a type wherein the polybasic acid residue, although replacing two polyhydric alcohol hydroxyls, has not replaced two hydroxyls of the same polyhydric alcohol, but has replaced two hydroxyls, each one of which is attached to a separate polyhydric alcohol molecule or residue.

If one mole of phthalic anhydride be cause to unite with two moles of ethylene glycol, and if one mole of oleic acid be combined therewith by uniting with one of the remaining hydroxyls, then the material thus obtained may be indicated by the formula:

in which the polybasic acid residue A has replaced two polyhydric alcohol hydroxyls, but said two hydroxyls were attached to two different molecules. It so happens that this type of mixed ester contains a residual hydroxyl and may be considered as the mixed basic type of ester. If this ester thus obtained is esterified with an added molecule of oleic acid, then the mixed ester thus obtained may be represented by the type formula:

It is to be noted that this type formula represents a mixed neutral ester. If the product thus described and derived from two moles of oleic acid, two of ethylene glycol and one mole of phthalic acid were obtained from a mole of citric acid, which is a tricarboxy acid instead of a phthalic acid, then one might represent the resulting type by the formula:

In all of these formulas the symbols have their previous significance.

Mixed esters may not only contain one monocarboxy, detergent-forming acid residue, but they may contain more than one, as illustrated in the formulas, wherein D occurs more than once. Likewise, the polybasic acid residue might enter into the constituent of the mixed ester more than once, as, for example, in the case where two moles of phthalic anhydride united to join together three moles of ethylene glycol and one of the residual hydroxyls is esterified with oleic acid. In the examples first described, the polybasic acid residue A was joined to a single polyhydric alcohol residue, in view of the fact that said residue replaced two hydroxyls of the same polyhydric alcohol. In the last class of mixed esters described the polybasic acid residue replaces two hydroxyls not attached to the same polyhydric alcohol residue. Since there is a certain cyclic structure between A and R in the former class, said former type will be referred to as cyclic. The word "cyclic" is not used in its ordinary significance, but simply with this specific significance. The latter type of materials which have been described will be characterized as non-cyclic. Here again "non-cyclic" is used in its peculiar obvious significance, and not in a manner usually employed in organic chemistry. Various polyhydric alcohols may be employed. They may be aliphatic, aromatic, cyclic, aralkyl, heterocyclic, etc. Suitable polyhydric alcohols include ethylene glycol, glycerol, erythritol, adonitol, mannitol, dihydroxy-naphthalene, alizarin, purpurin, terpin, dihydroxy-thiophene, etc. Simple derivatives of the alcohols, such as chloro-glycerol, ether alcohols, poly-glycols, poly-glycerols, etc. may be as effective as the unaltered polyhydric alcohols.

Likewise, one may employ various polybasic carboxy acids, including those of the aromatic type, alkyl type, aralkyl type, cyclic type, heterocyclic type, etc. Suitable examples including those previously pointed out are succinic, maleic, malic, aconitic, tartaric, citric, fumaric, tricarballylic, trihydroxy-glutaric, mesoxalic, phthalic, oxalic, diphenic, naphthalic, benzoyl-benzoic, trimesic, mellitic, cinchomeronic, quinolinic, camphoric, aspartic, norpinic, glutamic, etc. One may use the anhydrides instead of the acids themselves, or one may use the simple derivatives thereof. In addition, the polyhydroxy phenols, which are amphoteric in nature, such as catechol, resorcinol, quinol, pyrogallol, hexahydroxyphenol, etc., may be employed as and are equivalent to polybasic, carboxy acids when caused to react with more basic substances or are equivalent to polyhydric alcohols when caused to react with more acidic substances than themselves.

As previously indicated, D'COOH is a non-hydroxylated, monocarboxy, detergent-forming acid, such as oleic acid, stearic acid, palmitic acid, abietic acid, naphthenic acid, etc. It is understood that the simple derivatives of these acids, such as the chlorine derivatives, may be used instead of the acids themselves.

The manufacture of mixed esters is relatively simple. Generally speaking, the reagents are heated together under conditions which tend to remove the water formed as a result of esterification. In some instances the reagents are heated at a temperature higher than the boiling point of water. Sometimes esterification is carried on at a temperature lower than the boiling point of water, and a dried inert gas is passed through the mixed mass to eliminate any water which may be formed. Sometimes a catalyst, such as a trace of a mineral acid is added. These processes are well known and have been employed in the production of synthetic fats, neutral gums, plasticizers, synthetic resins, perfume materials, flavoring materials, etc.

It is also well known that complex organic molecules of the kind constituting the type of reagent contemplated herein for use in my process, exhibit a marked tendency to polymerize, condense or resinify. Such complex polymerized, condensed or resinified products are just as suitable for use as the demulsifying agent in my process as the simpler unpolymerized, uncondensed or non-resinous products and the claims attached to this specification are intended to include all types without differentiation.

If the reaction results in the formation of an amphoteric or acid mixed ester, then obviously the acidic hydrogen can be replaced by any equivalent. Such acidic material may be treated with a suitable alkaline material, such as caustic soda, caustic potash, ammonium hydroxide, calcium hydroxide, magnesium hydroxide, etc., so as to produce the corresponding metallic salts, many of which are water-soluble. The ammonium radical is considered as a metal. Basic amines, such as triethanolamine, aniline, etc. may be employed for neutralization. The acidic hydrogen may be combined with an alcohol of any kind, such as ethyl, methyl, propyl alcohols, etc. to produce an ester. The acidic hydrogen may remain unneutralized. The hydroxyl of the carboxyl may be combined with an amine by eliminating a hydrogen of the amine with the separation of a molecule of water. Water-soluble salts of the kind previously referred to may be reacted with metallic water-soluble salts, such as copper salts, iron salts, aluminum salts, zinc salts, magnesium salts, etc. to produce salts of the respective metals by metathesis.

The previously described types of materials indicated by the formulas:

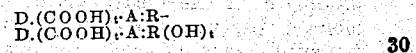

may be replaced by equivalent formulas, i. e.,

In these last mentioned type formulas the hydrogen of the carboxyl, H, is replaced by Z, which indicates an acid hydrogen equivalent of the kind described, or may mean the acid hydrogen itself, in the case of an unneutralized acid. For the sake of brevity, Z will simply be referred to as the acid hydrogen equivalent.

My preferred treating agent or demulsifying agent is produced by reacting one mole of glycerol (or 92 lbs.) with one mole of phthalic anhydride (or 148 lbs.) until complete esterification has taken place, i. e., until there is no residual carboxylic hydrogen. The resultant basic product, due to the residual hydroxyl, is combined with one mole (or 282 lbs.) of oleic acid, by heating, until the acidity of the carboxylic hydrogen of the oleic acid has disappeared. The finished product may be indicated by the formula D.A:R, in which D is an oleic acid residue, A is a phthalic acid residue and R is a glycerol residue, and characterized by the fact that two of the glycerol hydroxyls have been replaced by a single phthalic anhydride residue. Mono-olein is the product obtained by neutralization of one hydroxyl of a mole of glycerol by a mole of oleic acid. Phthalic acid may be considered as a phthalyl radical $C_6H_4(CO)_2$ plus two hydroxy radicals. If one considers mono-olein as losing two hydrogen atoms in the hydroxyl position, and a phthalyl radical being substituted therefor, one can refer to the preferred reagent just described as being neutral phthalyl mono-olein.

The materials previously described need not be employed alone, as a demulsifying agent, but may be employed in conjunction with other suitable demulsifiers, such as water softeners, modified fatty acids, oil-soluble or water-soluble petroleum sulfonic acids, substituted aromatic sulfonic acids, dialkyl sulfo acids, substituted amine acidic bodies, etc., or the salts and esters of the same or the like. One may add any suitable inert solvent or solvents to the reagent contemplated, particularly solvents which would lower the viscosity of the product and make it more adaptable for use, such as kerosene, solvent naphtha, cresol, pine oil, ethyl alcohol, butyl alcohol, propyl alcohol, benzol, etc.

In practicing my process, a treating agent or demulsifying agent of the kind above described may be brought in contact with the emulsion to be treated in any of the numerous ways now employed in the treatment of petroleum emulsions of the water-in-oil type with chemical demulsifying agents, such, for example, as by introducing the treating agent into the well in which the emulsion is produced, introducing the treating agent into a conduit through which the emulsion is flowing, introducing the treating agent into a tank in which the emulsion is stored, or introducing the treating agent into a container that holds a sludge obtained from the bottom of an oil storage tank. In some instances, it may be advisable to introduce the treating agent into a producing well in such a way that it will become mixed with water and oil that are emerging from the surrounding strata, before said water and oil enter the barrel of the well pump or the tubing up through which said water and oil flow to the surface of the ground. After treatment the emulsion is allowed to stand in a quiescent state, usually in a settling tank, at a temperature varying from atmospheric temperature to about 200° F., so as to permit the water or brine to separate from the oil, it being preferable to keep the temperature low enough so as to prevent the valuable constituents of the oil from volatilizing. If desired, the treated emulsion may be acted upon by one or the other of various kinds of apparatus now used in the operation of breaking petroleum emulsions, such as homogenizers, hay tanks, gun barrels, filters, centrifuges, or electrical dehydrators.

The amount of treating agent on the anhydrous basis that is required to break the emulsion may vary from approximately 1 part of treating agent to 500 parts of emulsion, up to a ratio of 1 part of treating agent to 20,000 parts of emulsion, depending upon the type or kind of emulsion being treated. In treating exceptionally refractory emulsions of the kind commonly referred to as "tank bottoms" or "residual pit oils", the minimum ratio above referred to is often necessary, but in treating fresh emulsions, i. e., emulsions that will yield readily to the action of chemical demulsifying agents, the maximum ratio above mentioned will frequently produce highly satisfactory results. For the average petroleum emulsion of the water-in-oil type a ratio of 1 part of treating agent to 10,000 parts of emulsion will usually be found to produce commercially satisfactory results.

Having thus described my invention, what I claim as new and desire to secure by Letters Patent is:

A process for breaking a petroleum emulsion of the water-in-oil type which consists in subjecting the emulsion to the action of a demulsifying agent comprising neutral phthalyl mono-olein.

CLAUDIUS H. M. ROBERTS.